US008485878B2

(12) United States Patent
Aaron et al.

(10) Patent No.: US 8,485,878 B2
(45) Date of Patent: Jul. 16, 2013

(54) GEOCACHING GAMES HAVING VIRTUAL PRIZES AWARDED IN AN ASSOCIATED VIDEO GAME AND RELATED METHODS AND COMPUTER PROGRAM PRODUCTS

(75) Inventors: Jeffrey Aaron, Atlanta, GA (US); John Ruckart, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1085 days.

(21) Appl. No.: 11/620,148

(22) Filed: Jan. 5, 2007

(65) Prior Publication Data

US 2008/0167129 A1 Jul. 10, 2008

(51) Int. Cl.
*A63K 99/00* (2006.01)
*A63B 71/02* (2006.01)

(52) U.S. Cl.
USPC ........ 463/6; 463/7; 463/40; 463/42; 273/440; 273/445; 273/446

(58) Field of Classification Search
USPC ........... 463/6, 59–60, 7, 40, 42; 273/445–446
See application file for complete search history.

(56) References Cited

U.S. PATENT DOCUMENTS

| 4,333,656 | A | * | 6/1982 | Sommer | 273/299 |
| 5,942,969 | A | * | 8/1999 | Wicks | 340/286.02 |
| 6,293,548 | B1 | * | 9/2001 | Swyers et al. | 273/236 |
| 6,320,495 | B1 | * | 11/2001 | Sporgis | 340/323 R |
| 6,850,837 | B2 | * | 2/2005 | Paulauskas et al. | 701/200 |
| 6,895,238 | B2 | * | 5/2005 | Newell et al. | 455/414.2 |
| 7,599,983 | B2 | * | 10/2009 | Harper et al. | 709/200 |
| 7,908,342 | B2 | * | 3/2011 | Harper et al. | 709/217 |
| 8,135,801 | B2 | * | 3/2012 | Harper et al. | 709/217 |
| 2004/0015562 | A1 | * | 1/2004 | Harper et al. | 709/217 |
| 2004/0102931 | A1 | * | 5/2004 | Ellis et al. | 702/188 |
| 2005/0143174 | A1 | * | 6/2005 | Goldman et al. | 463/42 |
| 2005/0250580 | A1 | * | 11/2005 | Bird | 463/42 |
| 2006/0036363 | A1 | * | 2/2006 | Crook | 701/202 |
| 2007/0024527 | A1 | * | 2/2007 | Heikkinen et al. | 345/9 |
| 2008/0009349 | A1 | * | 1/2008 | Wolfe | 463/42 |

OTHER PUBLICATIONS

"Introduction to Geocaching," 2001 Garmin Corporation Brochure.*
"Frequently Asked Questions About Geocashing," www.geocashing.com/faq/; accessed Oct. 17, 2006.
"The History of Geocaching," www.geocaching.com/about/history.aspx; accessed Oct. 17, 2006.
"Commonly Used Geocaching Terminology," www.geocaching.com/about/glossary.asex; accessed Oct. 17, 2006.
"Tips on Finding Your First Cache," www.geocaching.com/about/finding.aspx; accessed Oct. 17, 2006.
"Tips on Hiding Your First Cache," www.geocaching.com/about/hiding.aspx; accessed Oct. 17, 2006.
"Geocaching," Wikipedia, The Free Encyclopedia, http://en.wikipedia.org/wiki/geocaching; accessed Oct. 17, 2006.

(Continued)

*Primary Examiner* — Arthur O. Hall
*Assistant Examiner* — Bach Hoang
(74) *Attorney, Agent, or Firm* — Myers Bigel Sibley & Sajovec, P.A.

(57) ABSTRACT

Methods of implementing geocaching games are provided in which information is provided regarding a location of a waypoint. Thereafter, it is confirmed that a player of the game physically arrived at the waypoint. After such confirmation has been obtained, the player may be awarded a virtual prize. Related geocaching games and computer program products are also disclosed.

15 Claims, 8 Drawing Sheets

OTHER PUBLICATIONS

"Geocaching Garmin-Style," Garmin Ltd., http://www.garmin.com/outdoor/geocaching/; accessed Oct. 17, 2006.

"Cache Types Explained," www.geocaching.com/about/cache_types.aspx; accessed Oct. 17, 2006.

Brochure "Introduction to Geocaching," 2001 Garmin Corporation.

"The History of Geocaching," http://geocaching.gpsgames.org/history/; accessed Oct. 17, 2006.

* cited by examiner

```
CACHE LISTING        POINTS
1. 90.011;33.127     100
2. 90.562;33.118     50
391.623;30.012       275
```

430 →

```
GAME LEADERS         POINT TOTALS    ITEMS IN DEPOSITORY
1. JOHN DOE          19,475
2. JOHN SMITH        18,620
3. MARY VANCE        18,100
4. JOSEPH CLARK      16,235
```

GEOCACHING GAMES HAVING VIRTUAL PRIZES AWARDED IN AN ASSOCIATED VIDEO GAME AND RELATED METHODS AND COMPUTER PROGRAM PRODUCTS

FIELD OF THE INVENTION

The present invention relates to gaming and, more particularly, to games that include aspects of both geocaching games and video games.

BACKGROUND OF THE INVENTION

A wide variety of video/computer games (referred to herein as "video games") are known in the art, including, for example, computer-based video games, video games that run on specialized game consoles (e.g., the PlayStation® I, II and II consoles sold by Sony Corporation and the Xbox® consoles sold by Microsoft Corporation), handheld video games (e.g., the GameBoy® and Nintendo DS® products sold by Nintendo Corporation), as well as a wide variety of games played on larger machines that are typically located in arcades or other commercial establishments. Each of the aforementioned types of video games have achieved high levels of popularity with both youth and adults alike.

Over the last decade, Internet or online "web-based" video games have also increased in popularity. In these web-based video games, the game software is typically stored on one or more remote servers, and players access the game over the Internet and/or other networks. One type of web-based video game that has grown in popularity is known as Massively Multiplayer Online Games ("MMOG") which can support hundreds or even thousands of players. MMOG games may be played in a giant, persistent world.

Another game that has grown in popularity is an action/adventure game that was introduced around the year 2000 that is known as "geocaching." Geocaching is an outdoor hide-and-seek (treasure hunting) type game in which "caches" are hidden (either inside or outside) in urban or rural areas. The goal of the game is to find a hidden cache based upon the coordinates of the cache and/or other clues or information that are provided regarding the location of the cache. Typically, a cache comprises a waterproof, sealed container that includes a logbook and a writing instrument, and may also include one or more rewards such as, for example, books, CDs, videos, DVDs, money, jewelry, trinkets, antiques, games, etc.

Caches are typically set up and maintained, without charge, by individuals that are interested in playing geocaching games. In most geocaching games, a player obtains the coordinates (usually latitude and longitude) of a hidden cache (and/or other information regarding the location of the cache) from an Internet website. A dozen or more Internet websites containing extensive lists of cache locations exist, and may easily be located by searching on the term "geocache" using an Internet search engine. The coordinates of caches may also be obtained, for example, from other caches and/or shared between game participants.

A conventional geocaching game may be played as follows. First, a geocache game participant or "player" obtains the coordinates of a selected cache from an Internet website or from some other source. Next, the player enters the coordinates of the cache into a handheld Global Positioning Satellite ("GPS") receiver. The player then physically travels to the location of the cache, using the GPS receiver as a navigational aid. Upon reaching the specified coordinates, the player then searches for the hidden cache. After the cache is found, the player typically signs and dates the logbook, and may take a reward (if any) from the cache. If a reward is removed from the cache, the player is expected to leave a reward of equal or greater value in its place. Geocaching games rely on an honor system with respect to the taking and leaving of awards in caches. Unfortunately, this honor system is not always followed, and caches are sometimes plundered.

Increasing realism is a common thread among today's games, as is increased interaction between players of the game and/or between the game and the player. Games that achieve both high levels of interaction and high levels or realism tend to be very successful.

SUMMARY

Pursuant to embodiments of the present invention, methods for implementing geocaching games are provided. Pursuant to these methods, an individual that desires to play a geocaching game is provided information regarding the location of a waypoint. The individual (or "player") may then travel to the waypoint using, for example, a GPS receiver as a navigational aide. After it has been confirmed that the player physically arrived at the waypoint, the player is awarded a virtual prize. The virtual prize may be awarded to the player while the player is physically present at the waypoint. The virtual prize may be associated with a video game aspect of the geocaching game.

By way of example, in some embodiments of the present invention, the virtual prize may be points that are awarded in the video game aspect of the game or a key that facilitates entry into a different level of the video game. In other embodiments, the virtual prize may be a virtual object in a virtual cache that is associated with the waypoint. More than one virtual prize may be available. In such instances, the virtual prize awarded to the player may be selected based on a variety of criteria such as, for example, (1) the absolute time that the player is confirmed as being physically present at the waypoint, (2) the time that the player arrives at the waypoint as compared to the times that other players arrive at the waypoint or (3) how long it takes the player to reach the waypoint after being provided the information regarding the location of the waypoint.

In some embodiments of the present invention, the information provided regarding the location of the waypoint may be the coordinates (e.g., latitude and longitude) of the waypoint. In other embodiments, the information provided regarding the location of the waypoint may be a clue as to where the location is. The information regarding the location of the waypoint may, but need not be, provided to the player by the video game.

In some embodiments, confirming that the player physically arrived at the waypoint may be accomplished by receiving a message from the player transmitted over a location-capable wireless device. In such embodiments, the message may include information as to a current location of the location-capable wireless device. In other embodiments, the confirmation that the player physically arrived at the waypoint may be receipt of a message from the player that includes information that generally could only be obtained at the waypoint. In some embodiments, each player may be charged a fee to access the video game.

Pursuant to further embodiments of the present invention, computer-based games are provided that include a video game component. In addition, these computer-based games are capable of confirming that a player of the game is physically present at a pre-selected location. These computer-based games may award the player a virtual prize for successively reaching the pre-selected location.

Pursuant to additional embodiments of the present invention, methods of implementing a geocaching game are provided in which a message is received from a player of the game indicating that the player visited a pre-selected waypoint. It is then confirmed (by one of a variety of methods) that the player in fact visited the waypoint. After this confirmation is received, the player may be awarded a virtual prize. The player may be presented with a virtual logbook and allowed to make an entry into the virtual logbook. The prize may be a virtual object that the player may remove from a virtual cache, and the player may be allowed to place another virtual object into the virtual cache.

This geocaching game may be a multi-player geocaching game in which the player competes against other players. In some embodiments, the physical location of one or more of the players may be displayed to other of the players. The virtual prize that is awarded may be selected based on a number of factors such as, for example, the degree of difficulty associated with reaching the waypoint, the time (or order) that the player arrives at the waypoint as compared to other players, and/or the time (or order) that the player arrives at the waypoint after receiving information regarding the location of the waypoint.

In still further embodiments of the present invention, computer-assisted geocaching games are provided. These games may confirm that a player of the game physically arrived at a pre-selected location and, in response thereto, present a virtual logbook to the player. The player may add an entry into the virtual logbook. The game may also award the player a virtual prize after confirming that the player physically arrived at a pre-selected location.

Other systems, methods and/or computer program products according to embodiments will be or become apparent to one with skill in the art upon review of the following drawings and detailed description. It is intended that all such additional systems, methods and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION

Embodiments of the present invention now will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These teens are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
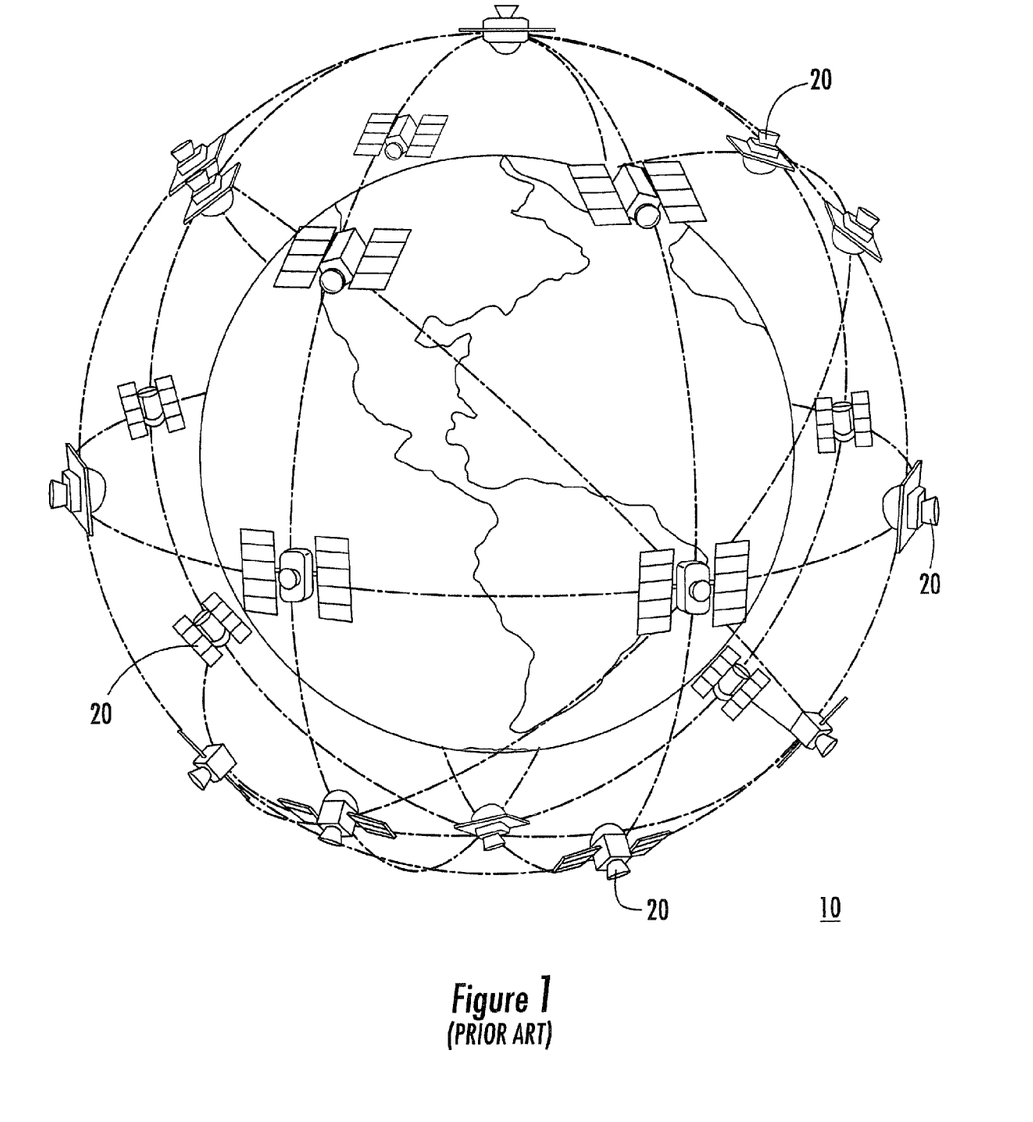
FIG. 1 is a schematic diagram illustrating a GPS system.

Pursuant to embodiments of the present invention, geocaching games, and related methods and computer program products, are provided. In the present disclosure, references are made to the term "waypoint" and to the phrase "virtual prize." Herein, the term "waypoint" is used to refer to a pre-selected physical location on the surface of the earth. The term "waypoint" is part of the geocaching vernacular, and refers to the physical location where a cache is hidden. Herein the term "waypoint" has the same meaning, except that an actual cache may not be present at the waypoint as, pursuant to embodiments of the present invention, a player may be awarded a virtual prize for reaching a waypoint or for answering questions with information obtained at a waypoint in lieu of receiving something from a physical hidden cache. Typically, a waypoint is designated by its coordinates in latitude and longitude. Likewise, the term "virtual prize", as used herein, refers to a reward that is made available or given to a player of the game that is not a real, physical reward, but instead is something that is created, provided and/or simulated by software and/or a computer or computer network. In certain embodiments, of the present invention, the virtual prize may comprise a reward that is useable in a video game aspect of the game such as, for example, points in the video game, access to different levels of the video game, access to special features in the video game such as special weapons, armament, magic etc. In other embodiments, the virtual prize may comprise a computer-based simulation or representation of an object such as a logbook or a trinket that a player may obtain in possess in a virtual computer/software generated reality. In still other embodiments, the virtual prize may be information, such as a clue to a mystery, which is provided to the user by the software and/or the computer or computer network FIG. 1 is a schematic diagram illustrating a GPS system 10 that may be used in playing geocaching games. As shown in FIG. 1, the GPS system 10 includes a plurality of global positioning satellites 20 that orbit the earth. The satellites are positioned such that a plurality of the satellites 20 (three or more) should generally be viewable from most locations on the surface of the earth.

Figure 2:
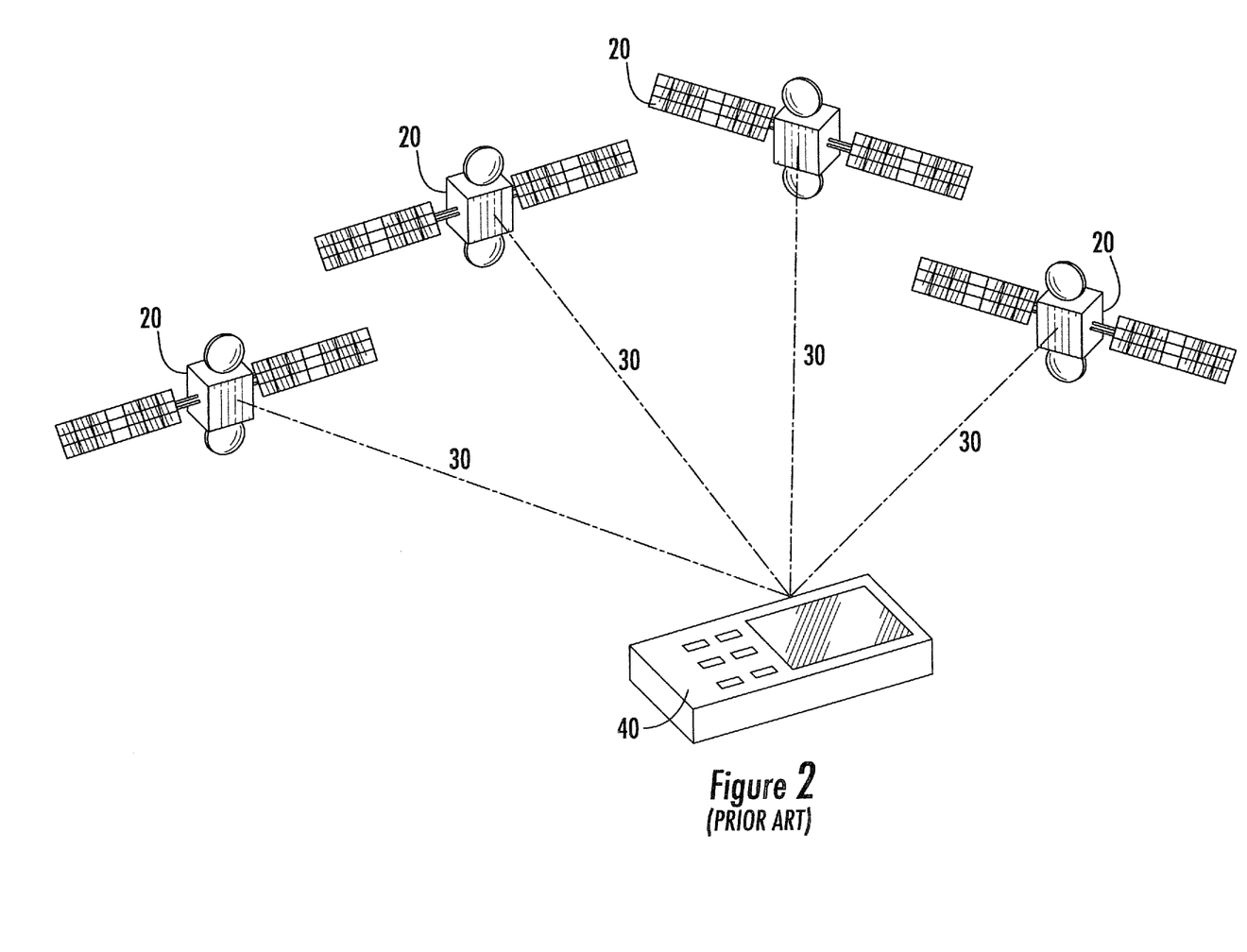
FIG. 2 is a schematic diagram that illustrates methods by which a GPS receiver may use signals transmitted by a plurality of satellites to determine the coordinates of the location of the GPS receiver.

FIG. 2 is a schematic diagram that illustrates the manner in which a GPS receiver 40 may use signals transmitted by a plurality of the satellites 20 of FIG. 1 to determine the coordinates of the location of the GPS receiver 40. As shown in FIG. 2, the GPS receiver 40 is able to receive signals 30 from several of the global positioning satellites 20. The signal 30 transmitted by each global positioning satellite 20 identifies the location of the satellite 20. The GPS receiver 40 uses triangulation techniques to determine the coordinates of the GPS receiver 40. Typically, a participant in a geocaching game enters the coordinates of a selected cache (as obtained, for example, from a geocaching website) into the GPS receiver 40. The GPS receiver 40 may include built in maps, an electronic compass, voice navigation and various other features that help direct the user to the cache (i.e., to the coordinates that were entered into the GPS receiver 40). It will also be appreciated that other navigational techniques may be used in lieu of, or in addition to, GPS receivers to play geocaching games including, for example, assisted-GPS, Enhanced Observed Time Difference, Uplink Time Difference of Arrival, Advanced Forward Link Trilateration and Cell ID.

While a GPS receiver may accurately pinpoint the location of a cache, physically getting to the cache may still be quite difficult. For example, a cache may be located on the side of a cliff such that it is only be accessible by rock climbing, or may be located underwater or underground. Many caches are located far away from any roads or other vehicle access points such that a long hike is required to reach the cache. Moreover, terrain barriers such as mountains, rivers, canyons, etc. may effectively increase the hiking distance required to reach a cache, since the shortest route to a particular cache may not always be physically possible to travel. In fact, part of the game may involve using map reading skills to select a best route to a cache location that takes into account both distance and terrain obstacles.

Additionally, once a player has used a GPS receiver to arrive at the location of the cache, it may still be a significant challenge to find the hidden cache. While GPS receivers having accuracies to within as little as 6 to 20 feet are commercially available, many GPS receivers have far less accuracy, and may only place a player within 50-100 feet of the hidden cache. Moreover, the caches may be very small (some are even referred to as microcaches, and may be no larger than a 35 mm film canister), and may be well concealed.

While conventional geocaching games have proven to be very popular, they primarily challenge participants at an individual level in the sense that they may not involve team play and/or head-to-head competition with others. As such, some conventional geocaching games may lack some of the team camaraderie and/or competitive atmosphere that attracts many individuals to games and sports. Additionally, the rewards that are placed in most caches have low monetary value, as caches are typically maintained and stocked by individuals who often have little incentive to leave valuable rewards for others. Most geocaching games involve hiding an actual cache, which may make some otherwise interesting locations unsuitable as cache locations (e.g., the middle of a large public square that is devoid of hiding places). Moreover, significant volunteer work is required to maintain the many existing caches (which can be subject to damage from environmental factors such as weather events or animals, vandalism and/or plundering) and to create new ones. As a result, geocaching games have generally not been commercialized in the way that video games have.

In contrast, many conventional video games may involve direct competition between (and/or interaction with) other game participants. Conventional video games may also be well-suited to commercialization in the form of selling game modules, games and/or software, or in providing on-line games over the Internet that can be funded by pay-to-play fees, subscription fees and/or by Internet advertising. As a result of this commercial structure, it is possible to offer prizes to participants who win multi-player games, as it may be relatively easy to fund the prizes through entrance fees and/or advertising revenues. However, many conventional video games may be played solely on a computer, game console or arcade unit, and hence often involve limited physical activity, and can result in eye strain when played for extended periods of time. Conventional video games are also typically played indoors at a single location, and thus may not involve any interaction with nature.

As noted above, pursuant to embodiments of the present invention, geocaching games, and related methods and computer program products, are provided. In some embodiments of the present invention, the game may primarily comprise a video game that also includes a geocaching component. Pursuant to this geocaching component, an individual that is playing the game (a "player") would be required to, or alternatively be given the option of, traveling to a "waypoint" that is identified to the player as part of the video game in order to earn points, access to different levels of the video game or other desirable features or things that assist the player in the video game. As noted above, herein a "waypoint" is a preselected physical location on the surface of the earth. In other embodiments, the game may primarily be a geocaching game, but the cache aspects of the game are replaced with a "virtual cache" that is implemented in a video game like component of the game that might be accessible, for example, via a player's GPS-enabled cellular telephone. In still other embodiments, the game may again primarily be a geocaching game, but may use video game like features to give the game a multiplayer aspect and to allow players to compete against one another.

Figure 3:
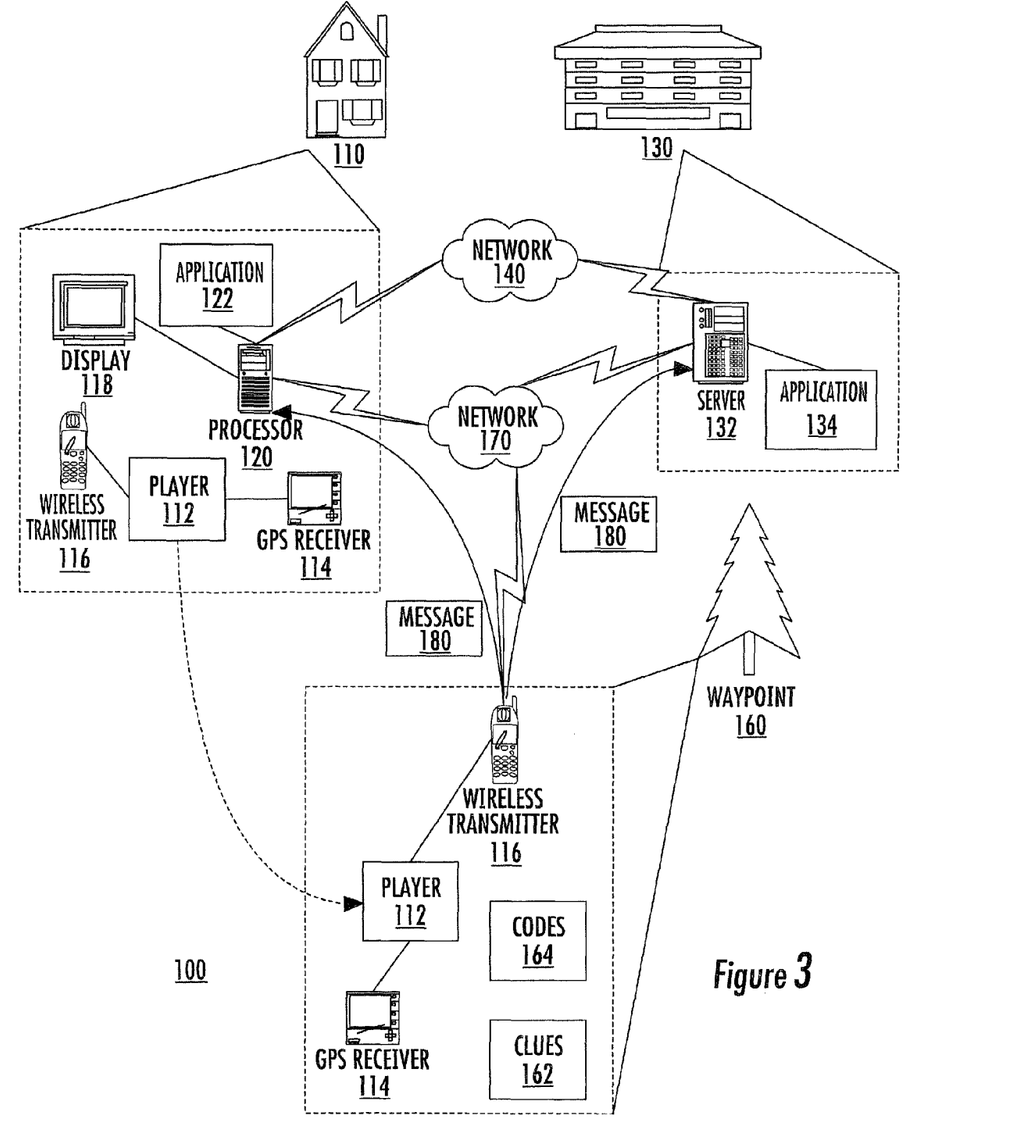
FIG. 3 is a schematic diagram illustrating various components that may be involved in playing geocaching video games according to various embodiments of the present invention.

FIG. 3 is a schematic diagram that illustrates exemplary environments in which games 100 according to embodiments of the present invention may be used. As shown in FIG. 3, the environment may include a first location 110 in which a game participant or "player" 112 initiates the game. This first location 110 might comprise, for example, the player's home or office. The player 112 may have a GPS receiver 114. The player 112 may also use a wireless transmitter 116 such as, for example, a cellular telephone. It will also be appreciated that in some embodiments of the present invention the wireless transmitter 116 may be omitted. It will also be appreciated that the GPS receiver 114 and the wireless transmitter 116 may be combined into a single device such as, for example, a location-capable wireless telephone.

As is also shown in FIG. 3, the player 112 may also use a display 118 and some form of computer or processor 120 that serves as a game console 120. The display 118 and processor 120 may be located at the first location 110. The display 118 and processor 120 may be used to run and/or present to the player 112 the video game aspects of the game 100. While FIG. 3 depicts the display 118 and the processor 120 as separate items as would be the case, for example, with a computer and monitor or with a Sony Playstation II® that is played on a television set, it will also be appreciated that the display 118 and the processor 120 may alternatively be implemented as a single unit as would be the case, for example, with a Nintendo GameBoy®. It will also be appreciated that, in certain embodiments of the present invention, the display 118 and the processor 120 may be implemented in a cellular telephone (which may be a location capable cellular telephone that serves as the GPS receiver 114 and wireless transmitter 116) or in some other handheld or mobile device.

As is also shown in FIG. 3, the environment may also include a server 132 that may be located at a second (remote) location 130. This remote server 132 may facilitate the playing of the game in a number of different ways. By way of example, in some embodiments of the present invention, some or all of the video game aspects of the game 100 may be implemented as an online Internet or "web-based" game. In such embodiments, a video game application 134 may be hosted on the remote server 132. The video game application 134 may deliver, over one or more networks 140 such as the Internet, web pages to the processor 120 which are then displayed on the display 118. As discussed in more detail below, the remote server 132 (or some other remote server) may also receive confirmation (via a network such as network 170) that the player 112 has reached a waypoint, and in response to that confirmation award the player 112 a virtual prize in the video game application 134. It will be appreciated that while some embodiments of the present invention are implemented as web-based games, in other embodiments, some or all of the video game aspects of the game may comprise a software application 122 that is run on the processor 120 instead of on the remote server 132.

As noted above, the player 112 may receive coordinates of a waypoint 160. These coordinates may be provided to the game participant 112, for example, via the video game and displayed to the player 112 on the display 120. As shown by the dotted line in FIG. 3, after receiving the coordinates, the player 112 may enter the coordinates into the GPS receiver 114 and then use the GPS receiver 114 to travel to the waypoint 160 associated with the coordinates.

As is also shown in FIG. 3, clues 162 and/or codes 164 may be located at the waypoint 160. The player 112 may use these clues 162 and/or codes 164 in aspects of either or both the geocaching and/or video game portions of the game 100, as discussed in more detail herein. As is also shown in FIG. 3, in some embodiments of the present invention, the wireless transmitter 116 may send a message 180 to the video game application (which may be, for example, video game application 134 on the server 132 or the video game application 122 on the processor 118). The message 180 may include the coordinates of the GPS receiver 114 in order to confirm that the player 112 was physically present at the waypoint 160. In response to this confirmation, the player 112 may be awarded a virtual prize, as will be discussed in more detail herein with respect to exemplary embodiments of the present invention.

Various exemplary embodiments of the present invention will now be described in more detail with respect to FIG. 3 and FIGS. 4-6.

In some embodiments of the present invention, the game 100 may primarily be a video game that also includes a geocaching component. The game 100 may include features such as, for example, virtual characters, figures, icons or objects whose movements and actions (e.g., firing weapons) are controlled by a player 112 of the video game in an effort to attain one or more goals. In conventional video games, the goal of the game often involves having the character/object compete against other characters/objects, overcome obstacles, solve puzzles, defeat enemies, avoid injury, etc.

In addition to these and/or other conventional video game features, the game 100 also includes a geocaching component pursuant to which the player 112 of the game 100 would be required to, or alternatively be given the option of, traveling to a waypoint 160 that is identified to the player 112. Typically, the waypoint 160 would be identified to the player 112 through the video game aspect of the game 100, although other implementations are possible. The waypoint 160 would usually be identified by a set of coordinates such as a latitude and a longitude, although, in certain embodiments of the present invention, the waypoint 160 may be identified in other ways such as, for example, as clues to a puzzle that the player 112 must solve to figure out the coordinates of a location or the location itself (i.e., the Washington Monument or some other well known historic or geographic landmark). Upon receiving the coordinates or otherwise identifying the location of the waypoint 160, the player 112 may then locate and travel to the identified waypoint 160 using, for example, conventional geocaching navigational techniques. Once at the waypoint 160, the player 112 may provide a confirmation that they have reached the identified waypoint 160. This confirmation could be provided, for example, by sending a message 180 from a location-capable wireless device 114/116 to a processor 120 or server 132 on which the video game portion of the game 100 is running. This message 180 may include, for example, the coordinates of the location-capable wireless device 114/116. In other embodiments, this confirmation could be provided by, for example, the player 112 answering a question that is presented to the player 112 via the video game, where the answer to the question may generally only be found at the waypoint 160. In response to the player 112 confirming that they have in fact reached the waypoint 160, the player 112 may be awarded a virtual prize. This virtual prize may comprise, for example, something that assists the player 112 in winning the video game aspects of the game 100. By way of example, the virtual prize could be points in the game 100, access to a different level in the game, puzzle pieces, clues, access to weapons, health points, or other features that assist the participant in the game 100, etc.

Figure 4:
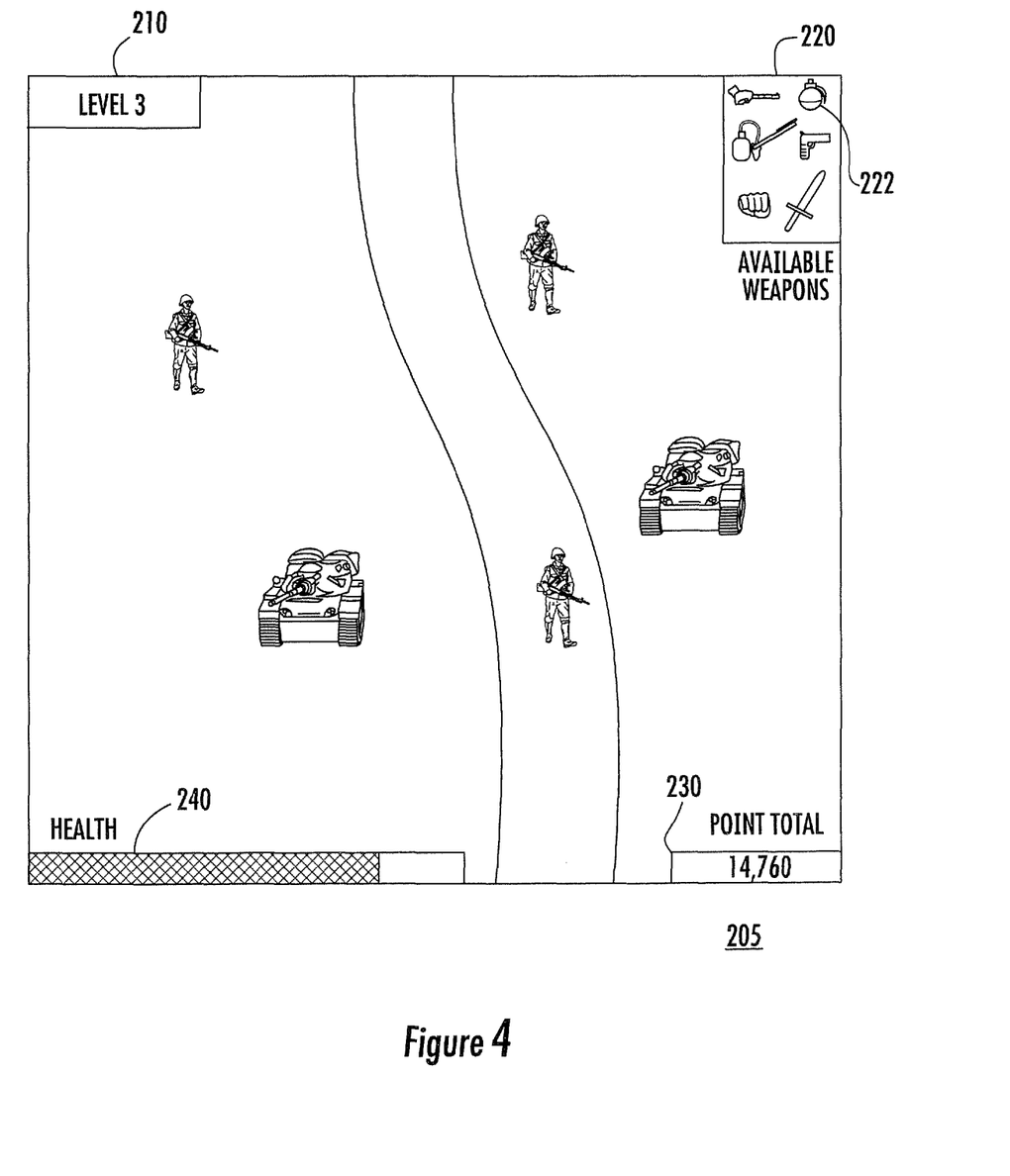
FIG. 4 is a schematic diagram illustrating an exemplary screen display of an exemplary geocaching video game according to certain embodiments of the present invention.

FIG. 4 depicts an exemplary screen display 205 of a game 200 according to certain embodiments of the present invention in which the game comprises a video game that includes geocaching aspects. As shown in FIG. 4, the screen display 205 may include, for example, virtual characters, figures, icons or objects whose movements and actions are controlled by a player 112 of the game 200. As is also shown in FIG. 4, the video game aspect of the game 200 may include a plurality of different levels, as shown by the level indicator 210 in the top left hand portion of the screen display 205. In certain embodiments of the present invention, the virtual prize that may be awarded upon receipt of confirmation that the player 112 has reached a waypoint 160 in the geocaching aspect of the game 200 may be access to another level of the video game aspect of the game 200. As shown by the box 220 in the top right hand corner of the screen display 205 of FIG. 4, in some embodiments, the video game may include a variety of "accessories" 222 such as weapons, armor, vehicles, etc. that a player 112 may use in attempting to achieve a goal of the video game. Typically, a player 112 can select the accessories 222 that the virtual character/object uses at any given time. In further embodiments of the present invention, the virtual prize that is awarded upon receipt of confirmation that the player 112 has reached a waypoint 160 in the geocaching aspect of the game 200 may be access to additional accessories 222. As is also shown in FIG. 4, the video game may keep a running point total (box 230) and/or a health, life, time or other meter (box 240) which generally runs down as the game 200 is played. In still other embodiments of the present invention, the virtual prize that is awarded upon receipt of confirmation that the player 112 has reached a waypoint 160 in the geocaching aspect of the game 200 may be the award of points and/or health, life, time or other resources that are generally a scarce (i.e., depleting) resource in the playing of the video game. Thus, by achieving success in the geocaching aspect of the game 200, a player 112 may improve his performance in the video game aspect of the game 200 according to certain embodiments of the present invention.

Figure 5:
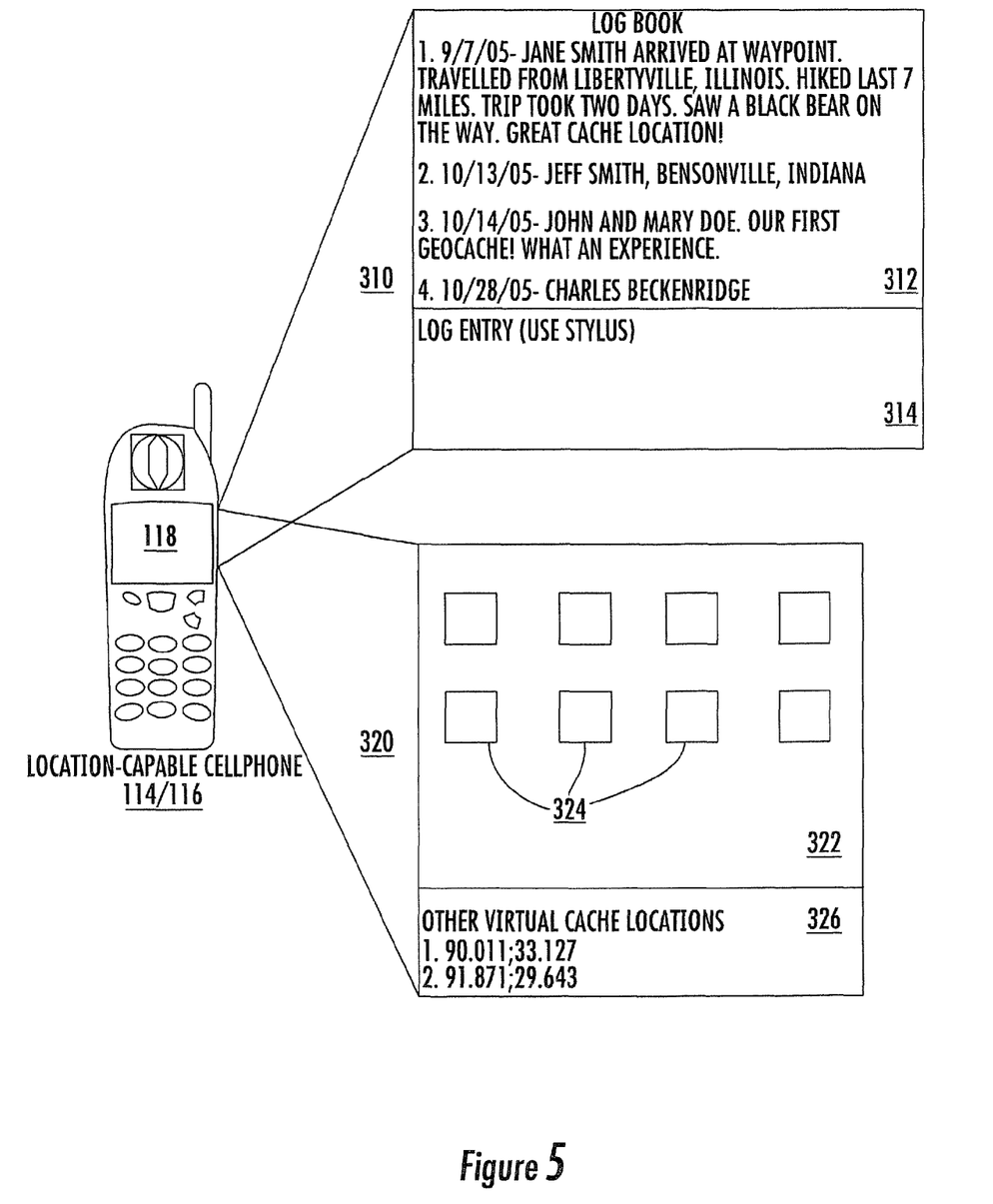
FIG. 5 is a schematic diagram illustrating exemplary screen displays of another exemplary geocaching game according to additional embodiments of the present invention.

In further embodiments of the present invention, the game 100 may be more similar to a conventional geocaching game, but may also include video game aspects that may improve a player's gaming experience. By way of example, the game could comprise a conventional geocaching game except that the cache (and the contents thereof) that would be hidden at the waypoint in a conventional geocaching game are replaced with a "virtual cache" that is implemented in a video game aspect of the game. FIG. 5 depicts exemplary screen displays 310 and 320 of one such game 300.

Referring now to FIGS. 3 and 5, in the geocaching aspects of the game, a player 112 could use a location capable (i.e., GPS enabled) cellular telephone 114/116 in place of a conventional GPS receiver. Upon arriving at the coordinates of a selected waypoint 160, the player 112 may connect to a server 132 to confirm to the server 132 that the player 112 had successfully arrived at the waypoint 160. As shown in FIG. 5, in response to confirming that the player 112 had arrived at the waypoint 160, the server 132 would display to the player 112 on the display 118 the items in the virtual cache. In particular, as shown in exemplary display screen 310 (an exemplary screen is a depiction of a display screen that might be displayed to a player), such items might include a logbook 312 which contains information regarding other players who had previously successfully made their way to the waypoint 160. The player 112 may also be provided a mechanism for writing into the logbook, as shown in box 314 of screen 310. The player 112 may also be given access to a virtual cache 322 that contains one or more objects or prizes 324, as shown in screen 320 of FIG. 5. The virtual cache 322 could be accessed by the player 112 through the video game aspects of the game 300. The player 112 might select an item 324 to remove from this virtual cache 322, thereby making the removed item 324 unavailable to players that later visit this particular waypoint 160. By way of example, the video game aspect of the game 300 could allow each player to have a virtual depository (which is not shown in FIG. 5) into which they can deposit items 324 that they remove from virtual caches 322 at the waypoints 160 that they visit. In such a game, the goal could be to find and collect a full set of objects that are hidden through a plurality of virtual caches 322 that are associated with respective of a plurality of waypoints 160. The player 112 may also place other items in their possession (i.e., from their virtual depository) into the virtual cache 322. In variations of such a game, players could be allowed to move items from one virtual cache to another, making it more complicated for other players who are trying to complete their set of objects. In each of the above-described game, the virtual caches 322 and logbooks 312 may replace the physical caches that are used in conventional geocaching games. Through the use of virtual caches, problems of, for example, upkeep, vandalism and plundering that can exist with physical caches may be reduced and/or avoided altogether. In certain embodiments, the virtual cache may also include coordinates and/or clues to the locations of other caches, as shown in box 326 of FIG. 5. This may be the only way for a player 112 to obtain location information for some of the waypoints 160.

In some cases, a player may have to visit more than one particular waypoint in order to earn a prize and/or access to a virtual cache. In such embodiments, the player must first visit one or more pre-requisite waypoints (as confirmed by GPS or other means) in order to be allowed access to the prize and/or virtual cache associated with another, "final" waypoint. The player could also be required to visit all of the waypoints (i.e., the pre-requisite waypoints and the final waypoint) in a particular order and/or within a predetermined amount of time in order to obtain the prize at the final waypoint. In still other embodiments, a basic prize may be awarded if the player reaches the final waypoint, and additional bonus prizes are awarded if the player first reached one or more of the pre-requisite waypoints and/or visited the waypoints in a particular sequence.

In still further embodiments of the present invention, the game may again primarily comprise a geocaching game, but may also include video game components that may allow for increased competition and interaction between players. By way of example, in some embodiments, the game may be presented as a video game in which players compete against other players and/or the game itself. In such embodiments, players may obtain the coordinates and/or other clues for waypoints via the video game interface. The players may then physically travel to selected waypoints using, for example, traditional geocaching techniques. Players may be awarded prizes within the video game, such as, for example, points, for successfully arriving at each waypoint. The amount of points awarded may be based on a wide variety of factors, including, for example, the difficulty involved in getting to the waypoint (which may be an absolute difficulty or may be variable depending, for example, on a player's starting location), the time it took the participant to arrive at the waypoint after receipt of the coordinates thereof, the player's order in arriving at the waypoint as compared to other players, etc.

Figure 6:
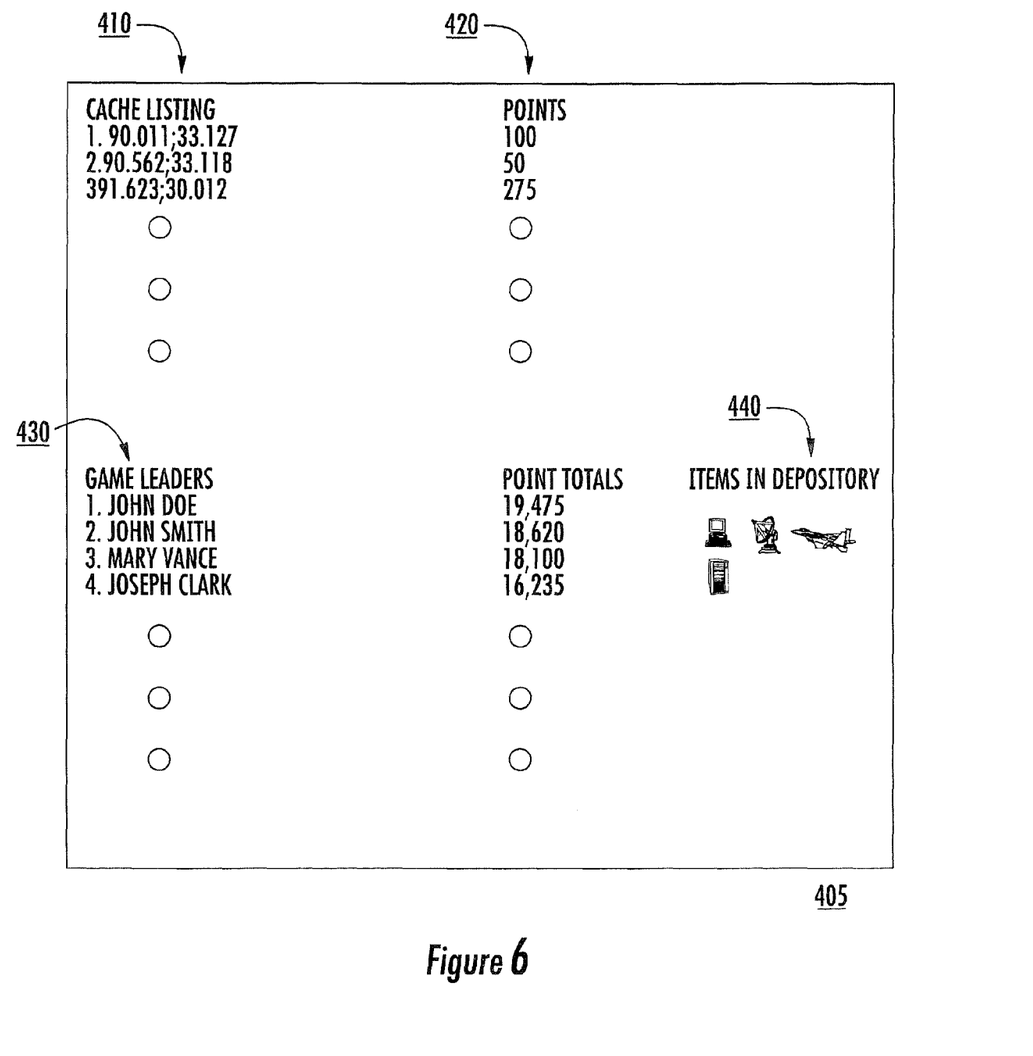
FIG. 6 is a schematic diagram illustrating an exemplary screen display of an exemplary game according to still further embodiments of the present invention.

FIG. 6 depicts a screen display 405 of exemplary embodiments of such a game 400. As shown in FIG. 6, the video game aspect of the game 400 may provide a player 112 a list of virtual caches 410, as well as an identification of the points 420 that will be awarded if the player 112 successfully reaches the waypoint 160 associated with each virtual cache. A listing of players having the highest point totals 430 could also be provided. In certain embodiments of the game 400, each player 112 might attempt to obtain a complete set of virtual objects that are awarded to a player 112 for successfully accomplishing feats such as arriving at a waypoint 160. In such embodiments, the screen display 405 could also list the virtual objects in each player's possession 440 and/or the virtual objects that are currently in each virtual cache (which, as noted above, may change over time if players have the ability to remove virtual objects from a virtual cache and/or to add virtual objects to a virtual cache).

Numerous variations on the above-described games are also within the scope of the present invention. By way of example, the game could be a murder mystery or other "clue" based game in which players 112 travel to waypoints 160 in order to earn clues that will help them to solve a mystery. In such games, the virtual prize that is awarded to a player 112 upon arrival at a waypoint 160 may be a clue to a mystery. Such a game may be played by a single player 112 who attempts to solve the mystery, or by a plurality of players 112 who are racing each other to be the first to solve the mystery. In some embodiments of such a game, other clues could be made available to players 112 for achieving success in an associated video game aspect of the game. In still other embodiments, multiple players could choose to cooperate as opposed to compete against each other. In particular, one or more teams of players could self-assemble or be formed, and this team or teams could then work together to achieve an award and/or to share in awards achieved by other team members. When multiple teams exist, the teams could compete against one another. Pre-configured rules for team play may be provided, and the players may select and/or agree to some or all of these pre-configured rules in order to establish the rules that apply for such team geocaching games.

As discussed above, pursuant to embodiments of the present invention, a player may be awarded a virtual prize, given access to a virtual cache and/or allowed to record an entry into a virtual logbook. In certain embodiments of the present invention, at least some of these game features may comprise data that may be manually or automatically (via software) inserted into existing types of messages such as, for example, e-mail messages, SMS messages, text messages, etc. By way of example, when a player reaches a waypoint, the game may send a message to the player's cellular telephone or other wireless device (or cause the device to make a pop-up window appear) that states, for example: "You have reached waypoint XYZ. If you wish to add an entry to the virtual logbook for this waypoint, text message your entry to address 123-456-7890." Each virtual logbook could have a unique number or address, and the game could require confirmation that the player is at the waypoint before allowing the player access to the virtual log as described above. As another example, the virtual prize could be a code that allows a player access to another level of a video game aspect of the game. The access code may be sent to the player, upon confirmation that the player reached the waypoint, in a text, SMS or e-mail message (or as an attachment thereto). Such an implementation would also allow for players to conveniently share and/or trade virtual prizes.

Figure 7:
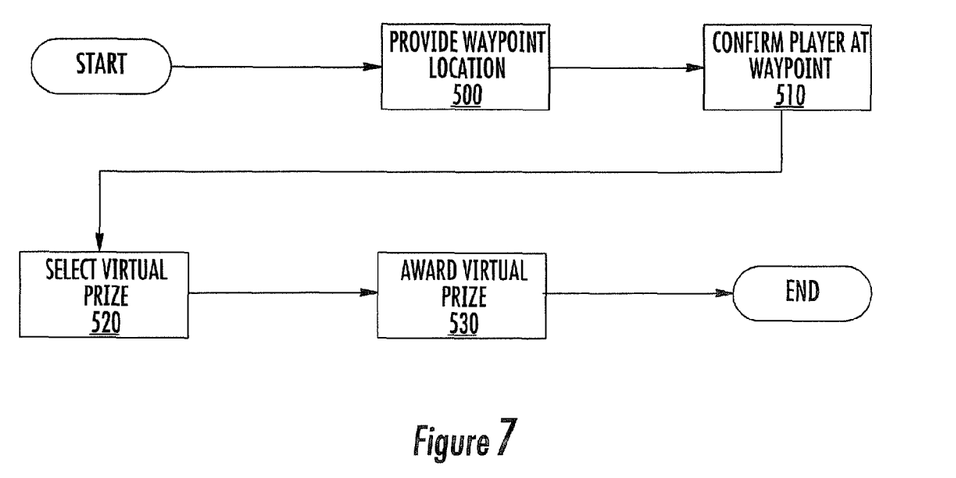
FIG. 7 is a flowchart illustrating methods of implementing a game according to further embodiments of the present invention.

FIG. 7 is a flow chart illustrating methods of implementing a game according to certain embodiments of the present invention. As shown in FIG. 7, the method may start with the provision of the location of a waypoint (block 500). As discussed above, the location may be specified in terms of a set of coordinates or in some other fashion, and may be provided in the video game aspect of the game or in some other fashion. Next, the game may involve confirming that the player physically arrived at the waypoint (block 510). This may be done, for example, by receiving a message from the player transmitted over a location-capable wireless device, where the message includes information as to a current location of the location-capable wireless device, or by receiving a message from the player that contains information that was obtained at the waypoint. In some embodiments of these methods, a virtual prize that is to be awarded to the user may then be selected (block 520). This selection may take place, for example, where there are a plurality of different prizes that might be awarded. A number of different criteria may be used to select the virtual prize. For example, in some embodiments, the virtual prize may be selected based at least in part on a time that the player is confirmed as being physically present at the waypoint. In other embodiments, the virtual prize may be selected based at least in part on the time that the player is confirmed as being physically present at the waypoint as compared to the respective times that one or more other players are confirmed as being physically present at the waypoint. In still other embodiments, the virtual prize may be selected based at least in part on the time that the player is confirmed as being physically present at the waypoint as compared to a time that the information regarding the location of the waypoint was provided to the player. It will be also appreciated that numerous other criteria for selecting the virtual prize may be used. Finally, as shown at block 530 of FIG. 7, the virtual prize may be awarded to the player.

Figure 8:
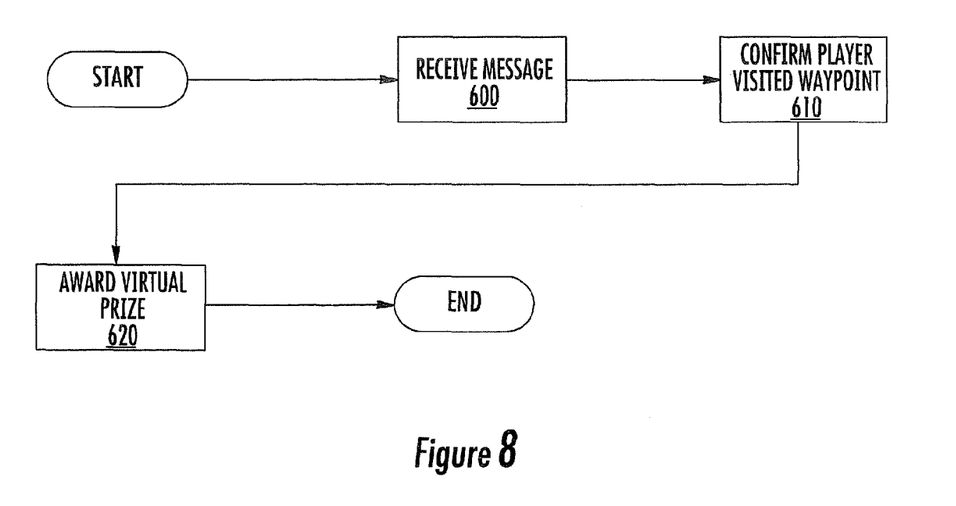
FIG. 8 is a flowchart illustrating methods of implementing a game according to still further embodiments of the present invention.

FIG. 8 is a flow chart illustrating methods of implementing geocaching games according to further embodiments of the present invention. As shown in FIG. 8, the method may start with the receipt of a message from a player of the game that indicates that the player has visited a pre-selected waypoint. This message may be sent by the player from the waypoint using a wireless transmitter such as, for example, a GPS enabled cellular telephone, or may alternatively be sent by the player at a later time from, for example, the player's home or office. Next, the game may involve confirming that the player physically arrived at the waypoint (block 610). This may be done, for example, by receiving a message from the player transmitted over a location-capable wireless device, where the message includes information as to a current location of the location-capable wireless device, or by receiving a message from the player that contains information that was obtained at the waypoint. Finally, a virtual prize may be awarded to the player (block 620).

Figure 9:
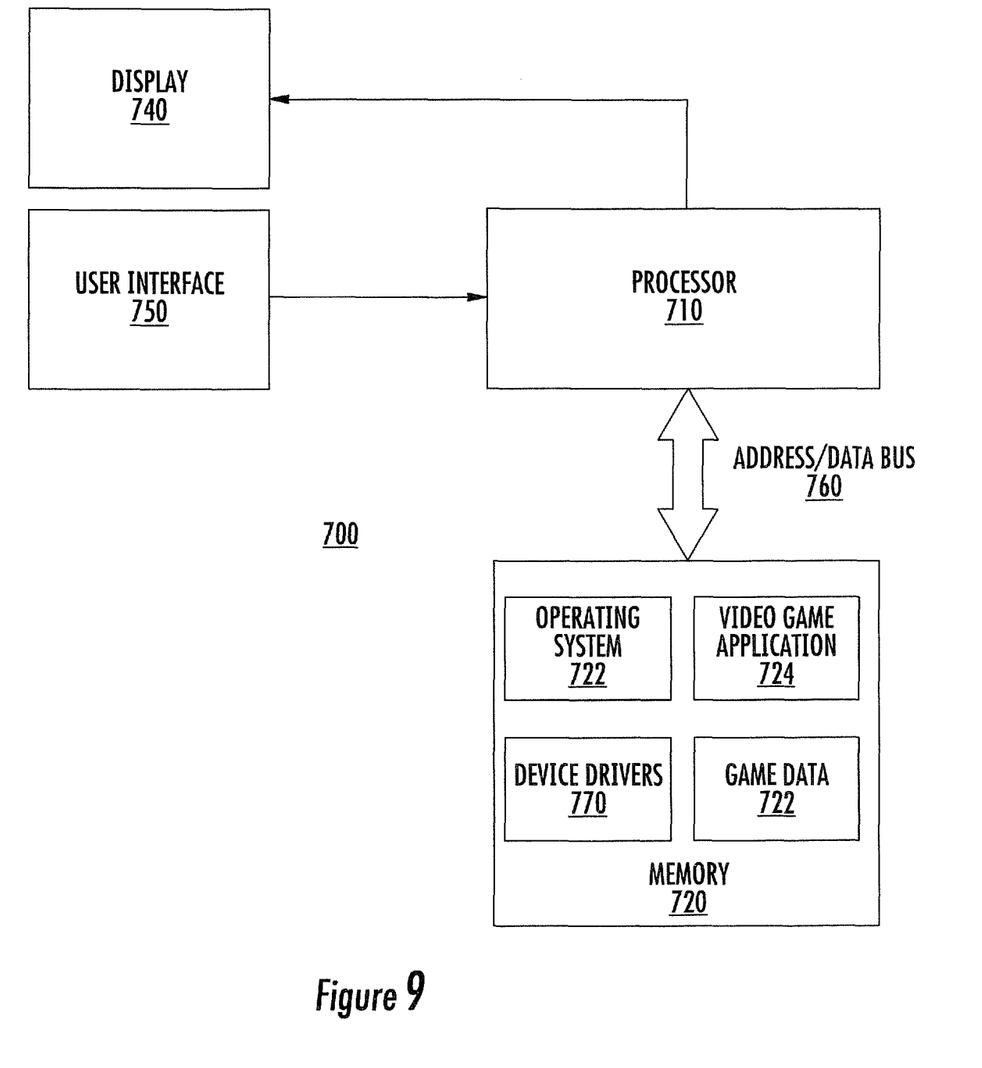
FIG. 9 is a block diagram illustrating a system that may be used to implement geocaching video games according to certain embodiments of the present invention.

FIG. 9 is a block diagram illustrating a system 700 which may be used to implement games according to certain embodiments of the present invention. As shown in FIG. 9, the system 700 includes a processor 710, a memory 720, a display 740 and a user interface 750. As shown in FIG. 9, the processor 710 is coupled to a user interface 750 and a display 740. As noted above, in some embodiments of the present invention, the user interface, the display and the processor may be co-located, and connected, for example, by an internal bus, cables, etc. In other embodiments, the processor 710 may be a remote server or other processor that is connected to the user interface 750 and/or display 740 over one or more networks.

The processor 710 may communicate with the memory 720 via an address/data bus 760. The processor 710 can be any commercially available or custom microprocessor. The memory 720 is representative of the overall hierarchy of memory devices. The memory 720 can include, but is not limited to, the following types of devices: cache, ROM, PROM, EPROM, EEPROM, flash memory, SKAM, and DRAM. As shown in FIG. 9, the memory 720 may include, for example, an operating system 722 and the video game application 724. The memory may also include data associated with the video game (e.g., the contents of each players virtual depository) and input/output (I/O) device drivers 770. As will be appreciated by those of skill in the art, the operating system 722 may be any operating system suitable for use with a data processing system, such as OS/2, AIX, System390 or z/OS from International Business Machines Corporation, Armonk, N.Y., Windows2000 or WindowsXP from Microsoft Corporation, Redmond, Wash., Unix or Linux. The I/O device drivers 770 typically include software routines accessed through the operating system 722 by the application programs such as the video game application 724 to communicate with devices such as I/O data port(s) and certain memory components.

It will also be appreciated that embodiments of the present invention may include mechanisms for providers of the game to commercially profit from making the game available to players. By way of example, in online versions of the game in which HTML web pages are transmitted from a game server 132 for display on a players display 118, at least some of the HTML web pages that are displayed may include banner or other types of advertisements and/or hyperlinks. The game provider may sell or rent advertising space on the HTML web pages. Such an online version of the game could also be set up so that players are charged subscription fees to get access to the game (or to get access to various aspects, features and/or levels of the game). Other embodiments may be software based, where a player, for example, loads software onto their computer or purchases a cartridge that may be loaded into a game console. In these embodiments, the software and/or cartridge may be sold to players, allowing a game provider to recoup their investment in creating, developing and distributing the game. In still other embodiments, players could be offered the opportunity to purchase virtual prizes or other things that assist the player in achieving the goal of the game. For instance, to obtain access to a particular level of a game, a player might have to successfully travel to a particular waypoint that is quite difficult to reach. Some players of the game might find it too difficult to reach this waypoint. In certain embodiments of the present invention, players could be given the option of purchasing access to the level by, for example, a credit card payment to the game provider. This may provide another mechanism for a game provider to recoup their investment and/or to profit from making the game available.

Many geocaching games may be primarily or completely implemented, without charge by enthusiasts of the game. In fact, geocaching enthusiasts have gone to great lengths and expense in setting up caches, complicated murder mystery games, etc. for other geocaching enthusiasts to play. Pursuant to embodiments of the present invention, mechanisms could be provided which allow such enthusiasts to continue to establish games that are then incorporated into an overall game suite that is made available by a gaming provider. For example, geocaching enthusiasts may establish, modify and/or manage particular games via, for example, a web-based interface. The web-interface may allow such an enthusiast to start (and subsequently manage) a game by defining various aspects of the game such as the type of game, the waypoints, the virtual objects included in each virtual cache, specific riles for the game, etc. These aspects may be defined using menu and/or parameter selections. The enthusiast could, for example, choose waypoints from a pre-defined list of waypoints or could create new waypoints and associated virtual caches. The virtual objects could be selected and/or obtained from customized lists, downloadable software, on line tool boxes, from trades with other players, purchased, etc. The web-interface may also include collaboration tools that allow teams of game designers to successively add to a game while ensuring that the subsequent changes and/or additions to the game do not damage the functionality of the game by automatically checking for self-consistency and/or by applying other types of checking rules. It will also be appreciated that the gaming provider may develop their own games to include in the game suite.

In still further embodiments of the present invention, a players location in the physical world may be displayed on maps which can be accessed in the video game aspect of the game. In such embodiments, a location-capable wireless transmitter may be used to periodically update a game server/application regarding the location of a particular user. This feature may be particularly desirable in multi-player games, as it will allow other players to track their competitors and perhaps deduce their game strategies.

In one set of specific embodiments, a wireless telephone provider may offer geocaching games such as the games described herein as part of a service. The game could be run on one or more computer servers maintained by the wireless provider. A software application running on the server could verify when a player reaches a waypoint by, for example, receiving a message sent by the player on a location-capable cellular telephone or by receiving a message that includes specific information that the player was told to find at the waypoint and send to the server. In these embodiments, the virtual prize that is awarded to the player may be accessed by the player via the cellular telephone while present at the waypoint. The player could also be given the opportunity to view and/or make entries into a virtual logbook associated with the waypoint while at the waypoint (e.g., via the cellular telephone). Any video game aspect of the game could also be accessed by the player using their cellular telephone. This service could be run, for example, as a pay-to-play or subscription service.

As will be appreciated by one of skill in the art, the present invention may be embodied as a method and/or as a system. Moreover, aspects of embodiments of the present invention may take the form of a computer program product on a computer-usable storage medium having computer-usable program code embodied in the medium. Any suitable computer readable medium may be utilized including hard disks, volatile memory, non-volatile memory, CD-ROMs, optical storage devices, a transmission media such as those supporting the Internet or an intranet, or magnetic storage devices.

Computer program code for carrying out operations of the present invention may be implemented using programmable aspects of existing application programs. Aspects of the computer program code may also be written in an object oriented programming language such as Java®, Smalltalk or C++ and/or using a conventional procedural programming languages, such as the "C" programming language. The program code may execute entirely on a single computer or on multiple computers, which may or may not be co-located.

The present invention is described above with reference to flowchart illustrations and block diagrams of methods and systems according to embodiments of the invention. It will be understood that blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be preformed on the computer or other programmable apparatus to produce a computer implemented process such that the instructions which execute on the computer or other programmable apparatus provide steps for implementing the functions/acts specified in the flowchart and/or block diagram block or blocks.

In the drawings and specification, there have been disclosed exemplary embodiments of the invention. Although specific term-s are employed, they are used in a generic and descriptive sense only and not for purposes of limitation, the scope of the invention being defined by the following claims.

That which is claimed is:

1. A method of implementing a game, the method comprising:
   providing information regarding a location of a respective one of a plurality of waypoints to a player of the game via a processor;
   confirming that the player of the game physically arrived at the respective one of the plurality of waypoints via the processor, comprising receiving a message from the player transmitted over a location-capable wireless device, wherein the message includes information as to a current location of the location-capable wireless device;
   displaying to the player via the wireless device items in a virtual cache associated with the respective one of the plurality of waypoints, wherein the player is allowed to remove a first item from the virtual cache and deposit the first item in a virtual depository, and wherein the player is allowed to move a second item from the virtual cache to another virtual cache associated with another of the plurality of waypoints to make it more complicated for other players to acquire the second item, wherein the virtual cache and the another virtual cache are accessed through a video game aspect of the game, wherein each player of the game has their own respective virtual depository, and wherein each player of the game is competing to complete their own set of virtual objects;
   displaying to the player via the wireless device a logbook that contains information regarding other players who had successfully made their way to the waypoint, and wherein the player can write an entry into the logbook via the wireless device;
   awarding the player a virtual prize after the confirming that the player physically arrived at all of the respective waypoints, the waypoint, wherein the virtual prize is associated with the video game and comprises points in the video game, and wherein the points are awarded based on a time that the player is confirmed as being physically present at the waypoint as compared to respective times that other players of the game are confirmed as being physically present at the waypoint, on a time it took the player to arrive at the waypoint after the providing of the information regarding the location of the waypoint, and on an order the player arrived at the waypoint with respect to the other players, wherein the awarding of the player the virtual prize is performed by the processor.

2. The method of claim 1, wherein the information regarding the location of the respective one of the plurality of waypoints comprises a set of coordinates for the respective one of the plurality of waypoints.

3. The method of claim 1, wherein the confirming that the player physically arrived at the respective one of the plurality of waypoints comprises receiving a message from the player that contains information that was obtained at the respective one of the plurality of waypoints.

4. The method of claim 1, wherein the information regarding the location of the respective one of the plurality of waypoints is provided to the player by the video game.

5. The method of claim 1, wherein the virtual prize is awarded after confirming that the player removed a set of items from the virtual caches of the respective plurality of waypoints.

6. The method of claim 1, further comprising using the video game to present a question to the player.

7. The method of claim 6, wherein the virtual prize is selected at least in part based on whether the player provides a correct answer to the question.

8. A video game that includes a non-transitory computer usable storage medium having computer readable program code embodied in the medium, the computer readable program code comprising:
   computer readable program code that provides information regarding a location of a respective one of a plurality of waypoints to a player of the game;
   computer readable program code that confirms that the player of the video game physically arrived at the respective one of the plurality of waypoints, comprising receiving a message from the player transmitted over a location-capable wireless device, wherein the message includes information as to a current location of the location-capable wireless device;
   computer readable program code that displays to the player via the wireless device items in a virtual cache associated with the respective one of the plurality of waypoints;
   computer readable program code that allows the player to remove a first item from the virtual cache and deposit the first item in a virtual depository;
   computer readable program code that allows the player to move a second item from the virtual cache to another virtual cache associated with another of the plurality of waypoints to make it more complicated for other players to acquire the second item, wherein the virtual cache and the another virtual cache are accessed through a video game aspect of the game, wherein each player of the game has their own respective virtual depository, and wherein each player of the game is competing to complete their own set of virtual objects;
   computer readable program code that displays to the player via the wireless device a logbook that contains information regarding other players who had successfully made their way to the waypoint, and wherein the player can write an entry into the logbook via the wireless device; and
   computer readable program code that awards the player a virtual prize in response to confirming that the player is physically present at the pre-selected location wherein the virtual prize comprises points in the video game, and wherein the points are awarded based on a time that the player is confirmed as being physically present at the pre-selected location as compared to respective times that other players of the game are confirmed as being physically present at the pre-selected location, on a time it took the player to arrive at the pre-selected location after the providing of the information regarding the pre-selected location, and on an order the player arrived at the pre-selected location with respect to the other players, and after the confirming that the player physically arrived at all of the respective waypoints.

9. The video game of claim 8, wherein the video game comprises a web-based video game.

10. The video game of claim 8, wherein the virtual prize comprises a key that facilitates entry into a different level of the video game.

11. The method of claim 1, wherein the method further comprises displaying a physical location of at least one of the other players on a display that displays the game.

12. The method of claim 1, further comprising awarding the player the virtual prize while the player is physically present at the respective one of the plurality of waypoints.

13. The method of claim 1, further comprising charging the player a fee to access the game.

14. The method of claim 1, further comprising displaying at least one advertisement on a display used by the player to play the game.

15. The method of claim 1, wherein the plurality of waypoints comprise a first waypoint, the method further comprising providing the player information regarding a location of a second waypoint in response to confirming that the player physically arrived at the first waypoint.

\* \* \* \* \*